Patented Jan. 5, 1926.

1,568,455

UNITED STATES PATENT OFFICE.

OSCAR F. HEDENBURG, OF PITTSBURGH, PENNSYLVANIA, ASSIGNOR TO FRANK O. MOBURG, OF TOLEDO, OHIO.

FUNGICIDE AND INSECTICIDE COMPOSITION.

No Drawing.     Application filed February 14, 1921. Serial No. 445,026.

*To all whom it may concern:*

Be it known that I, OSCAR F. HEDENBURG, a citizen of the United States, residing at Pittsburgh, in the county of Allegheny, State of Pennsylvania, have invented certain new and useful Improvements in Fungicide and Insecticide Compositions; and I do hereby declare the following to be a full, clear, and exact description of the invention, such as will enable others skilled in the art to which it appertains to make and use the same.

This invention relates to improvements in fungicide and insecticide compositions, and more particularly it relates to an improved composition comprising a mixture of dry lead arsenate, dry Bordeaux mixture and sticking and deflocculating agents. The invention also includes improvements in fungicide compositions comprising dry Bordeaux mixture together with sticking and deflocculating agents.

Ordinary Bordeaux mixture, in a dry powdered form, has very poor suspension, covering and adhesive qualities. It has been proposed to overcome these objectionable qualities by preparing the Bordeaux mixture in the form of a paste, the particles of which can be more readily maintained in suspension, but such pastes are inconvenient to handle and bulky and expensive to ship, and they also deteriorate from day to day so that they become of less value with increased age.

I have found that dry Bordeaux mixture, when compounded with suitable sticking and deflocculating agents, can be given suspension, covering and adhesive qualities comparable, and even superior, to those of Bordeaux paste, while the Bordeaux mixture is free from the objections of a paste and is particularly advantageous for storage, shipment and use.

I have further found that lead arsenate can be compounded with the dry Bordeaux mixture and with suitable sticking and deflocculating agents to form a mixture in which both the Bordeaux mixture and the lead arsenate will have superior suspension, covering and adhesive qualities, so that the composition is a particularly advantageous composition for use as a combined insecticide and fungicide.

A number of compositions of Bordeaux mixture and lead arsenate have been put on the market, but according to analysis and investigations made officially upon these compositions many of them have been found to be unbalanced in that they do not contain the proper proportionate amounts of lead arsenate and of Bordeaux mixture, while they are also lacking in suspension, covering and adhesive qualities.

The improved composition of the present invention, as above stated, contains both the lead arsenate and the Bordeaux mixture in a dry state, compounded with sticking and deflocculating agents, so that both the lead arsenate and Bordeaux mixture can be readily maintained in suspension during the spraying operation and substantially uniform spraying results obtained, together with superior covering and adhesive qualities of the spray when applied to the fruit or foliage.

The lead arsenate used in the composition of the present invention may be any of the lead arsenates of commerce, preferably the acid lead arsenate which contains around 32% to 33% of arsenic oxide, $(As_2O_5)$. The Bordeaux mixture is made in the usual way from lime and copper sulfate, but the amount of copper is preferably so regulated that the Bordeaux mixture will contain around 15-16% of copper. The Bordeaux mixture may thus be made from crystalline copper sulfate and the lime in the proportion of about 227 parts of the copper sulfate to 145 parts of lime. The proportions of Bordeaux mixture and lead arsenate can be somewhat varied, but a particularly advantageous composition is made from about one part by weight of lead arsenate to five parts by weight of Bordeaux mixture, so that in the resulting mixture there will be at least 12.7% of copper and about 3.6% of arsenic. The sticking and deflocculating agents which I have found particularly advantageous are casein and dextrin, the casein being used, for example, in amount from 1-1½% of the total composition, and the dextrin about 1% of the final composition. I have found that the adhesive or sticking properties imparted to the composition by the casein can be improved by the addition of a small amount of a soluble chromate, for example, one-tenth of one percent of sodium or potassium chromate or dichromate. In this composition the dextrin serves mainly as a deflocculating agent and the casein as a sticking or adhesive agent, and the combined use of these two agents with the lead arsenate and Bordeaux mixture gives a final composition which possesses remarkable suspension, covering and adhesive qualities. The mixture may be made by mixing the dry ingredients in a suitable mixer such as is used for mixing dry powders.

By properly proportioning the lead arsenate and Bordeaux mixture, and by compounding them in the manner described so that they will be maintained in substantially uniform and homogeneous suspension during spraying, it becomes possible to control and regulate the spraying operation so that the correct proportionate amounts of the lead arsenate insecticide and the Bordeaux mixture fungicide will be applied by a single spraying operation.

The composition above described contains the ingredients in proper proportions for a balanced fungicide and insecticide. This will be evident from the following illustrations. If, for example, four pounds of the composition are used with fifty gallons of water, the amounts of lead arsenate and Bordeaux mixture will correspond generally to two-thirds of a pound of arsenate of lead to fifty gallons of water, and an amount of Bordeaux mixture generally equivalent in copper content to that produced from two pounds of copper sulfate and two pounds of lime in fifty gallons of water. Such a Bordeaux mixture is commonly referred to as a 2—2—50 formula, being equivalent to a composition resulting from the use of two pounds of copper sulfate and two pounds of lime to fifty gallons of water. In a similar manner, by using six pounds of the composition, the equivalent of 3—3—50 Bordeaux formula is obtained, and about one pound of arsenate of lead will be used in the same amount of water (50 gallons). By using eight pounds of the composition there is obtained the equivalent of the 4—4—50 Bordeaux formula, together with about one and one-third pounds of arsenate of lead, when this amount of the composition is added to fifty gallons of water. By using ten pounds of the composition there is obtained the equivalent of the 5—5—50 Bordeaux formula and about one and two-thirds pounds of arsenate of lead when used in fifty gallons of water.

The composition of the present invention is of a rich blue color. It can be used directly for spraying purposes by adding it to water in the proper proportion, for example, four, six, eight or ten pounds of the composition to fifty gallons of water, to give formulas such as those above referred to. The small amount of deflocculating and adhesive compounds present in the composition enable the lead arsenate and Bordeaux mixture to be maintained in suspension during the spraying operation, without objectionable settling out, so that the spray liquor is of a uniform character and the spray is of correspondingly increased uniformity. The composition is thus an ideal product for use in protecting fruits and vegetables from many leaf-eating insects and certain fungi. This protection can, moreover, be obtained by a single spraying operation, with economy of time and labor, as well as the production of a spray of a uniform adherent character, due to the remarkable covering and adhesive qualities which the new composition possesses.

When a Bordeaux mixture fungicide alone is desired, without the lead arsenate, it can be produced in a similar manner by mixing the dry Bordeaux mixture in a finely divided state with small amounts of the deflocculating and sticking agents, and the resulting Bordeaux mixture will have similar advantages to those above described, without, however, the insecticidal properties due to the lead arsenate. Such a Bordeaux mixture composition thus has remarkable suspension, covering and adhesive qualities so that, although used in a dry state, it is nevertheless particularly advantageous for use, as well as for storage and shipment.

A typical composition embodying the invention, when both lead arsenate and Bordeaux mixture are present in the composition, may have the following analysis, (omitting the small amount of deflocculating and sticking agents):

| | Per cent. |
|---|---|
| Active ingredients— | |
| Copper of Bordeaux | 12.70 |
| Dry lead arsenate | 16.70 |
| Inert ingredients | 70.60 |
| Total arsenic (metallic) | 3.60 |
| Arsenic in water-soluble forms (metallic) not more than | 1.00 |
| Copper hydroxide equivalent or copper | 19.50 |
| Arsenic oxide | 5.55 |

I claim:

1. A dry fungicide composition comprising Bordeaux mixture together with dextrin and casein in amounts sufficient to secure a deflocculating and adhesive effect, said composition being readily suspendable in water for spraying and having improved spreading, covering and adhesive qualities when thus applied.

2. A dry fungicide and insecticide composition comprising Bordeaux mixture and lead arsenate together with deflocculating and sticking agents, said composition being readily suspendable in water for spraying and having improved spreading, covering and adhesive qualities when thus applied.

3. A dry fungicide and insecticide composition comprising Bordeaux mixture and lead arsenate together with dextrin and casein, in amounts sufficient to secure a deflocculating and adhesive effect, said composition being readily suspendable in water for spraying and having improved spreading, covering and adhesive qualities when thus applied.

4. A dry fungicide composition comprising Bordeaux mixture made from about 227 parts of crystalline copper sulfate and 145 parts of lime together with deflocculating and sticking agents, said composition being readily suspendable in water for spraying and having improved spreading, covering and adhesive qualities when thus applied.

5. A dry fungicide composition comprising Bordeaux mixture made from about 227 parts of crystalline copper sulfate and 145 parts of lime together with dextrin and casein in amounts sufficient to secure a deflocculating and adhesive effect, said composition being readily suspendable in water for spraying and having improved spreading, covering and adhesive qualities when thus applied.

6. A dry fungicide and insecticide composition comprising Bordeaux mixture and lead arsenate together with deflocculating and sticking agents, said Bordeaux mixture being made from about 227 parts of crystalline copper sulfate and 145 parts of lime and in which the lead arsenate and Bordeaux mixture are in the proportions of one part of lead arsenate to five parts of Bordeaux mixture, said composition being readily suspendable in water for spraying and having improved spreading, covering and adhesive qualities when thus applied.

7. A dry fungicide and insecticide composition comprising Bordeaux mixture and lead arsenate together with dextrin and casein in amounts sufficient to secure a deflocculating and adhesive effect, said Bordeaux mixture being made from about 227 parts of crystalline copper sulfate and 145 parts of lime and in which the lead arsenate and Bordeaux mixture are in the proportions of one part of lead arsenate to five parts of Bordeaux mixture, said composition being readily suspendable in water for spraying and having improved spreading, covering and adhesive qualities when thus applied.

8. A dry fungicide composition comprising Bordeaux mixture with dextrin, casein and a soluble chromate in amounts sufficient to secure a deflocculating and adhesive effect, said composition being readily suspendable in water for spraying and having improved spreading, covering and adhesive qualities when thus applied.

9. A dry fungicide and insecticide composition comprising a Bordeaux mixture and lead arsenate together with dextrin, casein and a soluble chromate in amounts sufficient to secure a deflocculating and adhesive effect, said composition being readily suspendable in water for spraying and having improved spreading, covering and adhesive qualities when thus applied.

10. A dry fungicide composition comprising Bordeaux mixture together with about 1% each of deflocculating and sticking agents, said composition being readily suspendable in water for spraying and having improved spraying, covering and adhesive qualities when thus applied.

In testimony whereof I affix my signature.

OSCAR F. HEDENBURG.